Nov. 21, 1933.   M. M. CLAYTON   1,936,081
ELECTRICAL TAKE-OFF CONNECTION
Filed Dec. 3, 1930   2 Sheets-Sheet 1
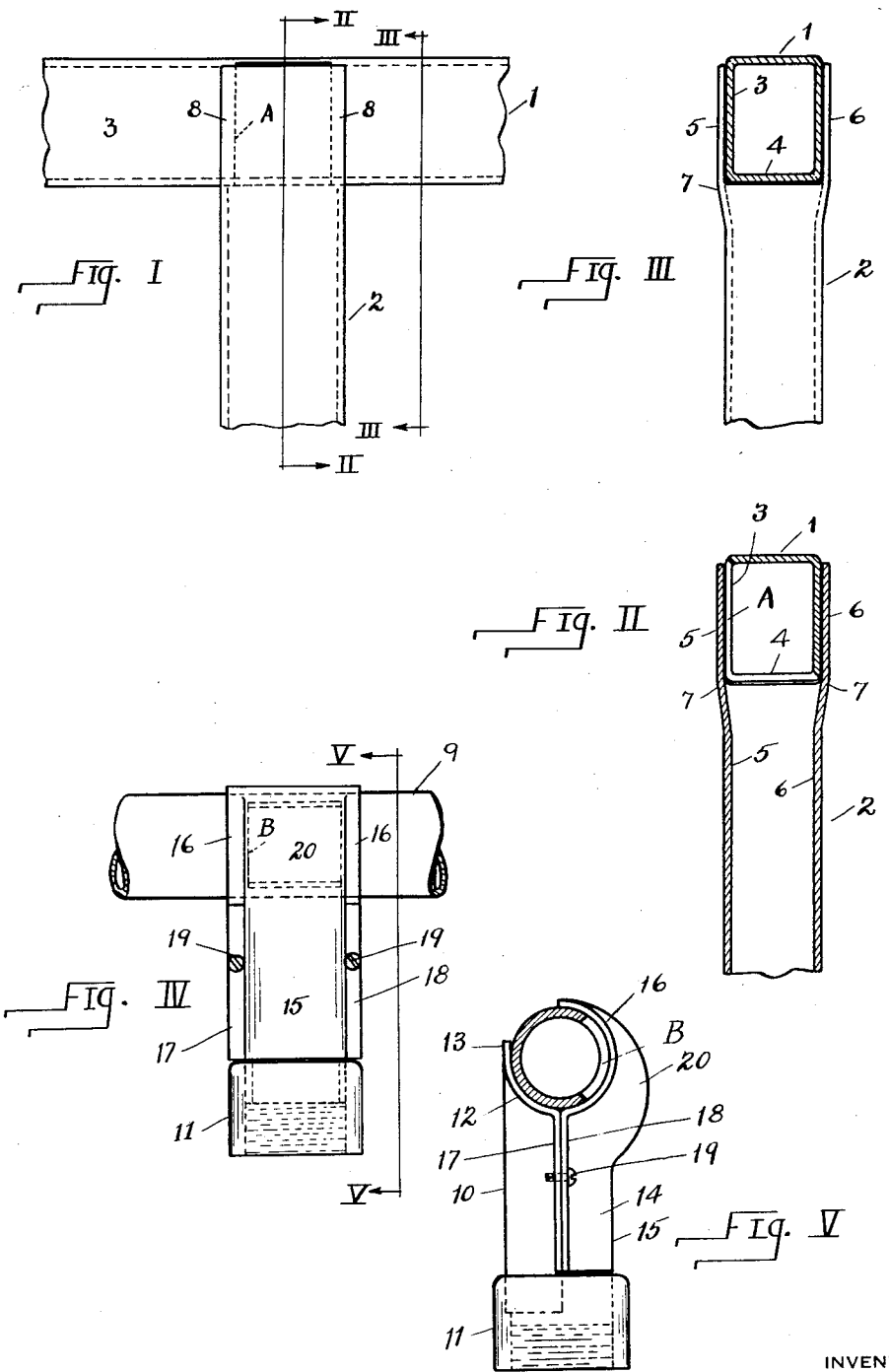

Nov. 21, 1933.   M. M. CLAYTON   1,936,081
ELECTRICAL TAKE-OFF CONNECTION
Filed Dec. 3, 1930   2 Sheets-Sheet 2
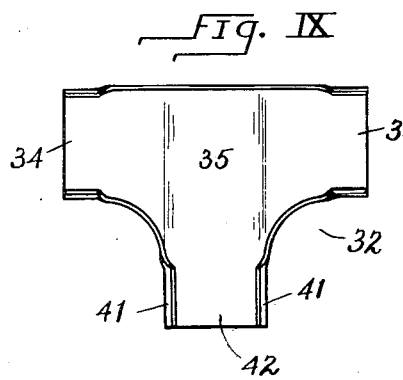
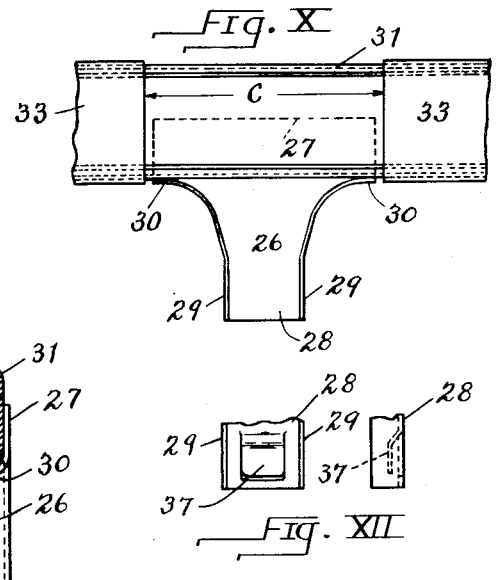
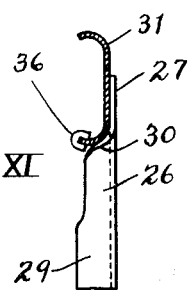
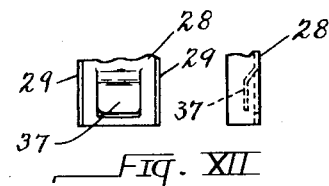
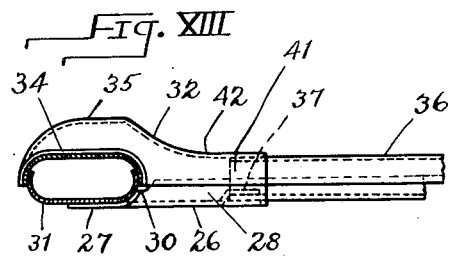
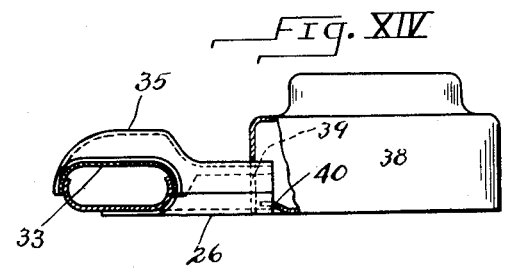
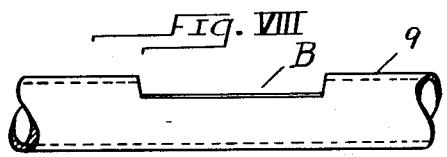
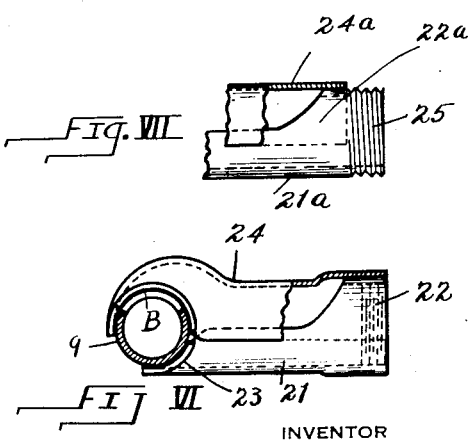
INVENTOR
Martin M. Clayton
by Christy Christy and Wharton
his attorneys Patented Nov. 21, 1933

1,936,081

UNITED STATES PATENT OFFICE 1,936,081

ELECTRICAL TAKE-OFF CONNECTION

Martin M. Clayton, Baden, Pa., assignor to National Electric Products Corporation, a corporation of Delaware Application December 3, 1930. Serial No. 499,697

6 Claims. (Cl. 247—28)

This invention relates to a take-off connection for electrical conduits.

The object of the invention is to provide a take-off connector which may be attached to a conduit, without removal of the conduit from the position in which it is mounted, to cover an outlet orifice made in the conduit and to receive and house wires led out from the conduit.

A more specific object of the invention is to provide a take-off connector which is adapted to engage an electrical conduit mounted against a wall or other surface, or in close proximity to another conduit, without removing the conduit as a whole, or in the region of its engagement by the connector, from its mounted position.

In the accompanying drawings Figure I is a plan view of an electrical conduit of simple form shown fragmentarily, and a take-off connector of my simplest design in position thereon to cover the take-off orifice in the conduit, and serve as a raceway for the wires taken off; Figure II is a longitudinal section through the conduit and take-off connector taken on the line II—II of Figure I; Figure III is a view showing the connector in side elevation and the conduit in section on the line III—III of Figure I; Figure IV is a plan view showing an electrical conduit of round section fragmentarily, and illustrating a take-off connector arranged to embrace and engage a conduit which is mounted in spaced relation to a wall or other mounting surface; Figure V is a view showing the conduit in section on the line V—V of Figure IV and the take-off connector in side elevation; Figure VI is a side elevation of a take-off connector and cross section through a round conduit illustrating a connector generally similar in form to that illustrated in Figures IV and V; Figure VII is a view partly in side elevation and partly in section illustrating a modification in the outer terminal of a take-off connector corresponding generally to that shown in Figure VI; Figure VIII is a fragmentary side elevation of a conduit circular in section illustrating the manner of cutting into the conduit to provide a take-off orifice, the conduit so prepared being suitable for use with take-off connectors as illustrated either in Figures IV and V, or in Figures VI and VII; Figure IX is a bottom plan view of the cover portion of a specialized connector adapted particularly for use with a specialized form of conduit, designed particularly for installation in direct contact with a mounting surface; Figure X is a plan view showing this form of conduit fragmentarily, and illustrating the position of the base member of the take-off connector in making a connection with the conduit; Figure XI is a side elevation of the base member of the connector and a cross section through the channel portion of the specialized conduit, illustrating the position of the base portion with respect to the conduit; Figure XII shows fragmentary portions of the base of the take-off connector in plan and in side elevation, and illustrates special means for the engagement of a branch raceway to the connector; Figure XIII is a view showing the connector in side elevation and a conduit of the preferred form in section, and illustrating the use of the connector in leading off a branch raceway from the specialized conduit; and Figure XIV is a view partly in side elevation and partly in section illustrating the attachment of the connector to the specialized conduit and the attachment of a fixture to the connector.

With reference to Figures I to III inclusive of the drawings, reference numeral 1 designates a conduit, which is simple, and of generally rectangular contour in section, and reference numeral 2 designates the take-off connector generally. This take-off connector may be initially a hollow conduit corresponding to conduit 1, but is so prepared that it may embrace the conduit and cover an orifice therein. The orifice A in the conduit, from which wires are to be led out, may be made by cutting in from a corner and removing a section which includes all or a portion of two adjacent sides 3 and 4 of the conduit. In construction the connector is a conduit of initial form similar to that of the conduit 1, but has two sides cut away at one terminal, leaving top and bottom walls 5 and 6. Throughout a length substantially equal to the width of the conduit 1 these walls 5 and 6 are deformed outwardly to provide a fork having sufficient width between its legs to embrace the conduit, and providing shoulders 7 at the inner end of the deformed portion of the connector.

With this structure the legs 5 and 6 at the terminal of the T may be caused to embrace conduit 1 in the region of the orifice A therein, and are positioned with respect to the conduit by means of the shoulders 7 in the T. As the T 2 is desirably of resilient material it will engage the conduit 1 by its own resiliency. As shown the orifice A in the conduit is made of slightly lesser width than the width of the legs 5 and 6, so that there are overlapping regions 8 in which the legs of the T connection engage the contacted wall 3 of the conduit.

It will be noted that this connection provides an uninterrupted space of suitable area through which the wires may be brought out from the conduit and into the take-off connector. An important feature is that the flat legs of the connector may be inserted readily between the conduit 1 and any surface to which it is closely adjacent, such as a wall or ceiling to which the conduit is directly mounted, or another conduit closely paralleling the conduit 1 to which the connection is to be made.

The conduit 9 shown in Figures IV, V, VI and VIII of the drawings is a simple conduit of circular section, and the modified form of take-off connector illustrated in Figures IV–VII inclusive is adapted to engage this conduit, and to embrace and enclose an opening B therein. As shown in Figure VIII this opening B may be made by cutting a longitudinally extending segment from the conduit. The length of the opening will be obviously regulated in accordance with the fitting which is to be used in connection with the conduit. As shown in Figures IV and V the take-off connector comprises a base member 10, having integral therewith a socket portion 11. At its outer or engaging extremity the base member 10 is shaped at 12 to conform to the external curvature of the conduit and has a relatively short flattened extension 13 at its extremity. The cover member 14 of the connector comprises a shank 15, and an extending portion 16, the latter having its inner edges shaped to conform to the external curvature of the conduit, and being of sufficient length to wholly cover the orifice B in the conduit.

With this modified form of take-off connector the connection assembly is made by means of mutually contacting flanges 17 and 18 on the base member of the connector and the cover member of the connector respectively, these flanges being interconnected by suitable means such as screws 19. The rearward portion of the base member 10 and the shank 15 of the cover member 14 are both of a trough shape in cross section, so that when the members are brought together in the assembly they provide together a tubular body of sufficient interior cross-sectional area to accommodate wires brought out from the conduit 9. The portion 20 of the cover member which has the conduit contacting surfaces 16 is curved outwardly from the plane of the shank portion 15, so that it also, and in itself, provides sufficient space for the reception of spliced wires.

The modified take-off connector of Figures IV and V is adapted to lead off wires from a conduit which is supported in spaced relation to its mounting surface and to which it is desirable that the take-off connection be positively clamped. The forward, or conduit-engaging, terminal of base member 10 is, however, so formed that it also may be inserted between the outer surface of the conduit 9 and another closely adjacent surface, such as a mounting surface or the surface of another conduit.

The form of take-off connector shown in Figure VI of the drawings is generally similar to that shown in Figures IV and V, being adapted to make connection with a conduit of circular cross section. It is, however, designed more particularly for connection with a conduit lying closely adjacent its mounting surface. The base member 21 of the take-off connection is, as in the form shown in Figures IV and V, integral with an internally-threaded socket portion 22, and has a similarly-shaped forward terminal 23 shaped to lie against the curved wall of the conduit. The cover member 24 is shaped similarly to the cover member 14 of the previously described form, but is arranged to overlap and resiliently engage the base member 21. For this reason the members are not provided with the co-operating flanges of the previously described type.

The free terminal of the take-off connection may be modified, as shown in Figure VII, so that the socket portion 22a of the base member 21a has an externally threaded portion 25, instead of being internally threaded as shown in Figure VI of the drawings. In this modification the cover member 24a is shortened, so that it does not extend over threaded portion 25.

The type of conduit to which Figures IX—XIV inclusive refer is adapted particularly to lie against its mounting surface, and is generally termed a "surface raceway". This raceway is made with a channel portion to be directly attached to the mounting surface, and a cap portion which fits upon and resiliently engages the channel portion of the raceway. In taking off wires from this raceway the section of capping in which the connection is to be made is removed from the channel portion of the raceway, and a section is cut from this length of capping to give in the assembled raceway a take-off opening in the desired position. The forms of take-off connector illustrated in the following figures of the drawings are designed particularly for use with a raceway of this type.

The base member of the take-off connector, designated generally by the reference numeral 26, has a relatively flat portion 27 arranged to be inserted between the channel member of the raceway and the surface on which it is mounted, and a portion 28 extending angularly from the flat portion 27. Toward its free end, extending portion 28 may be shaped to provide side walls 29, which constitute an abbreviated channel. As shown in the drawings, these walls 29 terminate at the junction between the portions 27 and 28, to provide abutments 30, which are adapted to contact the channel portion 31 of the raceway and position the take-off connector with respect thereto.

The cover member, designated generally by reference numeral 32, is so shaped that it embraces the raceway and the portion 28 of the base member, completely covering the opening C comprising the interval between the sections of capping 33. Desirably it engages the raceway by its own resiliency.

Figure XIII of the drawings illustrates an assembly in which wires are taken off from a main raceway of this special form into a branch raceway. In this assembly the cover member 32 of the take-off connector is shaped with lateral wings 34, which embrace and engage the conduit. Intermediate wings 34, the cover member is deformed upwardly to provide a channel 35 of ample area to accommodate the splices to the main wires between its inner surface and the upper edge of channel portion 31 of the raceway. Desirably this upper edge of the channel member is covered by a guard 36 of fibre or the like, in order that there may be no danger of its wearing through the insulation of the wires. This guard is shown in Figure XI of the drawings, and omitted from Figures XIII and XIV for the sake of clearness. The walls 29 on extending portion 28 of the base member, are embraced, and resiliently engaged, by walls 41 on the extending portion 42 of the cover member.

In the assembly shown in Figure XIII of the drawings the spliced wires are brought out over the edge of channel member 31 of the raceway and lie in extending portion 28 of base member 26. They may then extend into a raceway 36 of the same structure as the main raceway. This branch raceway is connected by inserting its terminal into the extending portion of the take-off connector. In this position the branch raceway may be held in place by slipping a terminal edge of its channel member beneath the tongue 37 on the extending portion 28 of base member 26. As shown in Figures XII and XIII of the drawings, this tongue may be conveniently provided by cutting and striking up a region in the body of extending portion 28. Obviously a tongue, similar to tongue 37, may be made on any of the modified forms of connector, although shown specifically in connection with Figures XII and XIII.

In the assembly shown in Figure XIV of the drawings the take-off connector forms a connection between the raceway and an outlet box 38. In this assembly both the base member and the cover member of the connector may be shaped as in Figure XIII, the free end of the connector being fitted into an opening 39 in the side of the box. Tongue 37 on extending portion 38 of the base member is, however, omitted, and portion 28 of the base member is engaged by a tongue 40 on the base of the outlet box. Obviously, if so desired the base of the outlet box and the base member of the take-off connector may be made in one piece when an outlet box is made for direct connection to a raceway.

All forms of the take-off connector present the advantage that by their use connection may be made at any desired point to a continuous run of conduit or raceway. This connection may be made when the conduit lies against a mounting surface as well as when it is supported in spaced relation thereto. These features are of particular advantage when a conduit or raceway has been installed and it is thereafter desired to make branch connections, or to install outlets for special purposes. It, however, is of initial advantage in that a continuous run of conduit, with take-off openings already made at the desired points therein, may be installed as a whole, and the connections made at the take-off openings; thus assuring proper alignment of the conduit when installed, and avoiding an accurate cutting of the conduit into sections and the fitting of branch connections thereto.

I claim as my invention:

1. An electrical take-off connection comprising the combination of a conduit having an opening through a wall thereof, with a take-off connector having a member arranged to lie against the conduit and enclose the opening therein, and an opposed member arranged also to contact the conduit and having a forward portion substantially flat to enter between the conduit and a surface against which it is closely mounted.

2. An electrical take-off connection comprising the combination of a conduit having an opening through a wall thereof, with a take-off connector having a member arranged to lie against the conduit and enclose the opening therein, and an opposed member arranged also to contact the conduit and having a forward portion substantially flat to enter between the conduit and a surface against which it is closely mounted, said connector members co-operating in the assembly to resiliently engage the conduit.

3. An electrical take-off connection comprising the combination of a conduit having an opening through a wall thereof, with a take-off connector having a member arranged to lie against the conduit and enclose the opening therein, and an opposed member arranged also to contact the conduit and having a forward portion substantially flat to enter between the conduit and a surface against which it is closely mounted, at least one of said members being provided with a conduit-abutting shoulder.

4. In an electrical take-off connection, a connector base member comprising a portion substantially flat to enter between an electrical conduit and a surface against which it is closely mounted, a trough portion extending angularly from said flat portion, and conduit-contacting abutment formed at the change of contour from said trough portion to said flat portion.

5. An electrical take-off connection comprising the combination of a conduit having an opening through a wall thereof, a base member having a flat portion adapted to enter between the conduit and a surface against which it is closely mounted and a trough portion extending angularly from said flat portion, and a cap member having a cover portion shaped to embrace the conduit to enclose the wall opening thereof and a neck portion shaped to match in assembly the trough portion of the base member to form therewith a closed branch raceway.

6. The combination of the claim next preceding in which at least the cap member of the assembly is resilient, whereby the cover portion of the cap member resiliently engages the conduit in the region of the opening which it encloses and the neck portion of the cap member resiliently engages the trough portion of the base member.

MARTIN M. CLAYTON.